United States Patent Office 3,329,659
Patented July 4, 1967

3,329,659
ISOBUTYLENE SULFIDE POLYMERS
Riad H. Gobran, Levittown, and Stephen W. Osborn, Yardley, Pa., assignors to Thiokol Chemical Corporation, Bristol, Pa., a corporation of Delaware
No Drawing. Filed Mar. 9, 1964, Ser. No. 350,584
6 Claims. (Cl. 260—79)

The present invention relates to a novel class of high molecular weight sulfur containing thermoplastic polymers and more particularly it relates to high molecular weight polymers of isobutylene sulfide. The novel polymers of the present invention are solid thermoplastic products that can be molded using conventional molding procedures to produce articles having various configurations.

An object of the present invention is to provide high molecular weight polymers of isobutylene sulfide.

Another object of the present invention is to provide a novel class of moldable polymers.

The objects of the present invention are accomplished by polymerizing isobutylene sulfide in the presence of a catalyst which is the reaction product of two components. One of these components is an organometallic compound of the formula $R_2M$ wherein R is alkyl or aryl and M is a metal of Group II–B of the periodic system, i.e., zinc, cadmium or mercury.

The second component, which is reacted with the organometallic component to form the catalyst, can be generally characterized as a substance having at least one pair of unshared electrons. However, all substances falling within this broad genus do not appear to be operative. One relatively large sub-genus that has been found to be operative comprises compounds having an active hydrogen atom, including, for example, water; hydrogen sulfide; primary and secondary alkyl amines, e.g., methyl, ethyl and diethyl amines; alkanols, e.g., mercaptoethanol; acetone; lower fatty acids, e.g., acetic acid; and aldehydes, e.g., butyraldehyde. In addition to this sub-genus, i.e., the compounds having an active hydrogen, it has been found that useful catalysts can be prepared employing as the second component or co-catalyst elemental oxygen or sulfur, carbonyl sulfide and carbon disulfide. The preferred catalyst is the reaction product of diethyl zinc and water.

The resulting polymers are solid, highly crystalline materials of high molecular weight which have melting points in the range of about 160 to 195° C. or more. The polymers can be molded into a variety of items using any of the molding processes conventionally used for thermoplastic resins. Polymers having the lower melting points, i.e., below about 175° C. have lower molecular weights and are more soluble in organic solvents generally than the polymers having higher melting points, i.e., above about 175° C.

The preparation of isobutylene sulfide is disclosed at pages 1050–1052 of the Journal of the Chemical Society, 1946.

As indicated above, the preferred catalyst used in preparing the solid polymers of the present invention is a reaction product of diethyl zinc and water. This catalyst may be prepared by reacting the diethyl zinc and water in an inert organic solvent, e.g., tetrahydrofuran, benzene, hexane, etc., at a temperature of about 20° to 50° C. and preferably about 25° C. The molar ratio of diethyl zinc to water may vary from about 1:1 to 3:1 and is preferably approximately 1:1. To insure optimum catalyst activity and the attainment of the highest molecular weights, this catalyst should be used within a period of not more than 48 hours after it is prepared. In most cases, it will be found desirable to prepare this catalyst in the polymerization reaction vessel just prior to or coincident with the initiation of the polymerization reaction.

It is expedient that the preparation of the diethyl zinc/$H_2O$ catalyst and that the polymerization reaction using these catalysts be carried out in an environment that is substantially free from elemental oxygen. Thus, the preparation of this catalyst and polymerization are desirably carried out under an atmosphere of inert gas such as nitrogen, helium or argon containing less than about 20 parts per million of oxygen. Commercially available grades of diethyl zinc have been found suitable for use in preparing the polymers of the present invention. The water with which the diethyl zinc is reacted should be distilled water, preferably deoxygenated by boiling in air and cooling under a pure nitrogen atmosphere. The solvent used in preparation of this catalyst should desirably be either dried over sodium or freshly distilled.

Details of the polymerization process for producing the novel polymers of the present invention are given in the specific examples set forth below. In general, the polymerization process is executed by bringing the monomeric isobutylene sulfide into contact with the catalyst prepared in the general manner described above. The catalyst is used to the extent of about 0.05% to 3% and preferably about .1% to 1%, based on the weight of the monomeric material being polymerized. The polymerization can be carried out satisfactorily at temperatures of about 0° to 80° C. and is preferably conducted at about 10° to 35° C. It has been found that polymers having the higher molecular weights and melting points are more readily prepared at reaction temperatures of about 0° to 10° C. The reaction may take several hours to several days.

The polymerization reaction may be conducted without using a solvent, or it may be conducted in inert organic solvents such as aromatic hydrocarbons, e.g., benzene, toluene, or xylene; and aliphatic hydrocarbons, e.g., isopentane, n-hexane, or octane. The reaction mixture may be agitated to facilitate the reaction. The pressure at which the reaction is carried out does not appear to be particularly critical. Thus the reaction may be conducted in an open vessel at atmospheric pressure or in a closed vessel under autogenous pressure. In a modification of the process wherein a solvent is used, the reaction vessel is desirably charged with the solvent, catalyst and monomer in that order. Where no solvent is used, however, it is preferable to preform the catalyst and then react the preformed catalyst with the monomer. The reaction system should also be anhydrous except for the amount of water required to form the diethyl zinc-water catalyst as described above.

It is to be understood that the term isobutylene sulfide polymer used herein connotes isobutylene sulfide homopolymers as well as interpolymers which contain a major portion of isobutylene sulfide and a minor portion of one or more other interpolymerizable monomers. Such other interpolymerizable monomers would include vicinal episulfide monomers such as styrene sulfide and alkylene sulfides such as ethylene sulfide, propylene sulfide, 1,2-butylene sulfide, 2,3-butylene sulfide, cyclohexene sulfide, vinyl cyclohexene sulfide, 2-benzyl-thiirane, para-methyl styrene episulfide, allyl thioglycidyl ether, thioglycidyl acrylates, thioglycidyl alkacrylates such as thioglycidyl methacrylate, vinyl cyclohexene episulfide, butadiene mono-episulfide and 1,2-epoxy-3,4-epithiobutane; cyclic sulfides having the structure

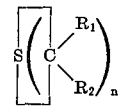

where $n=2$ to 6 and $R_1$ and $R_2$ may be H, a lower, branched or linear alkyl group having from 1 to 10 carbon atoms, an aryl, an arylalkyl and/or an alkylaryl group.

$R_1$ or $R_2$ may also be heterocyclic, alicyclic, bicyclic or polycyclic; examples of such cyclic sulfides are trimethylene sulfide, pentamethylene sulfide and hexamethylene sulfide; compounds containing ethylenic unsaturation, i.e., $CH_2=C<$, such as olefins, such as ethylene, propylene, butylene and isobutylene; conjugated and non-conjugated dienes, such as butadiene, isoprene and 1,4 pentadiene; and vinyls, such as styrene, vinyl acetate, ethyl acrylate, methyl acrylate, methyl methacrylate, butyl acrylate, acrylonitrile, vinyl isobutyl ether, α methyl styrene, hydroxy propyl methacrylate, tetrafluoroethylene, chlorotrifluoroethylene and hexafluoropropylene; compounds having the structure

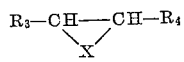

in which X is O or NH and $R_3$ and $R_4$ may be H, a lower branched or linear alkyl group having from 1 to 10 carbon atoms, an aryl, an aryl alkyl and/or an alkylaryl group; $R_3$ or $R_4$ may also be heterocyclic, alicyclic, bicyclic or polycyclic; examples of such compounds are styrene oxide, ethylene oxide, propylene oxide, 1,2-butylene oxide, 2,3-butylene oxide, ethylene imine and propylene imine; and other polymerizable compounds such as formaldehyde, trioxane, hydroxyisobutyric acid, tetrahydrofuran, 1,3-dioxolane, 1,4-dioxane, trimethylene oxide, tetramethylene oxide and pentamethylene oxide.

When molded, the polymer may be admixed with adjuvant materials commonly employed in the molding arts such as thermal degradation stabilizers, antioxidants, U.V. stabilizers, fillers, pigments, lubricants, flame retardant agents and nucleating agents.

The following examples are merely illustrative of the present invention and are not intended as a limitation upon the scope thereof.

*Example 1*

One and a half milliliters of a solution of diethyl zinc in benzene containing 4.74 millimoles of diethyl zinc per millimeter of solution was dissolved in 50 ml. of dry tetrahydrofuran. To 41.5 ml. of this solution, there was then added 0.082 ml. of distilled water. The resulting solution thus contained a molar ratio of 0.75 to 1 of water to diethyl zinc.

A clean, dry 12 ounce Coca-Cola bottle was sequentially charged with 11 grams of isobutylene sulfide, 11 ml. of sodium dry benzene and 4.7 ml. of the catalyst solution prepared above. This catalyst solution contained 0.282 millimole of diethyl zinc and 0.211 millimole of water. As soon as the catalyst had been added, the mixture in the Coca-Cola bottle exothermed to 55–60° C. After about one half hour, the temperature of the system had subsided to about room temperature. The bottle was then sparged with nitrogen and sealed. It was allowed to remain at room temperature for about 5½ days. The bottle was then opened and the contents were poured into 250 ml. of petroleum ether. The polyisobutylene sulfide which had been formed readily precipitated and was washed 3 times with 250 ml. portions of petroleum ether. The polymer product was then filtered and dried to constant weight. A yield of 4.2 grams or 38% of theoretical was obtained. The polymer had a melting point of 185° C. It was a crystalline white powder which is moldable into articles having various shapes and sizes using conventional molding procedures.

*Example 2*

To a six ounce Coca-Cola bottle, which had been previously cleaned and dried, there was added 6.6 grams of isobutylene sulfide, 25 ml. of dry benzene and 2 ml. of tetrahydrofuran which contained 0.164 millimole of diethyl zinc and 0.123 millimole of distilled water. The bottle was sparged with nitrogen and capped. The bottle was kept at room temperature for about 1 hour and was then placed in an 80° C. water bath for about 19½ hours. The bottle was cooled for about one and one-half hours to room temperature. The bottle was then opened and to it was added, 1 ml. of benzene containing 0.118 millimole of diethyl zinc and 0.088 millimole of water. The bottle was sparged with nitrogen and recapped. It was placed in an 80° C. bath for about 21½ hours longer. The total time at 80° C. was about 41 hours. At the end of the time, the bottle was opened and the polymeric product was precipitated in methanol and washed several times with fresh methanol. The polymer was filtered from the methanol and dried at 50° C. under about 30 inches of vacuum to constant weight. The yield was 3.4 grams or 51.5% of theoretical. The polymer was a white crystalline powder having a melting point of 165 to 170° C. which is moldable into articles having various shapes and sizes using conventional molding procedures.

*Example 3*

Eleven grams of isobutylene sulfide and 11 ml. of sodium dried benzene were placed in a six ounce Coca-Cola bottle which had been previously cleaned and dried. The bottle and contents were cooled to 0° C. To the solution in the bottle, there was then added 4.7 ml. of catalyst as prepared in Example 1, which contained 0.282 millimole of diethyl zinc and 0.211 millimole of water. The bottle was then sparged with nitrogen and sealed and kept at 0° C. for about 21 days. The temperature varied from 0 to about 10° C. during the polymerization time. At the end of this time, the bottles were opened and the polymer was precipitated in petroleum ether. The polymer was washed several times with 250 ml. portions of petroleum ether and then dried to constant weight. The polymer was obtained in a yield of 46.4%. The polyisobutylene sulfide product was a white crystalline powder having a melting point of 190 to 191° C. which is moldable into articles having various shapes and sizes using conventional molding procedures. The polymer was substantially insoluble in methyl ethyl ketone, dimethylformamide, tetrahydrofuran and benzene at temperatures ranging from about 25° to 70° C.

We claim:
1. A solid, thermoplastic, crystalline polymer having a melting point in the range of 160 to 195° C. and formed essentially of isobutylene sulfide monomer units.
2. A polymer as in claim 1 which is a homopolymer.
3. A solid, thermoplastic, crystalline polymer having a melting point of at least about 175° C. and formed essentially of isobutylene sulfide monomer units.
4. A polymer as in claim 3 which is a homopolymer.
5. An article molded from the polymer of claim 1.
6. An article molded from the polymer of claim 3.

References Cited

UNITED STATES PATENTS 3,222,326   12/1965   Brodoway _____ 260—79.7

FOREIGN PATENTS 480,077   1/1952   Canada.

JOSEPH L. SCHOFER, *Primary Examiner.*

D. K. DENENBERG, *Assistant Examiner.*